May 5, 1959
G. O. FORSETH
2,885,535
ELECTRODE HOLDERS
Filed June 8, 1956
2 Sheets-Sheet 1
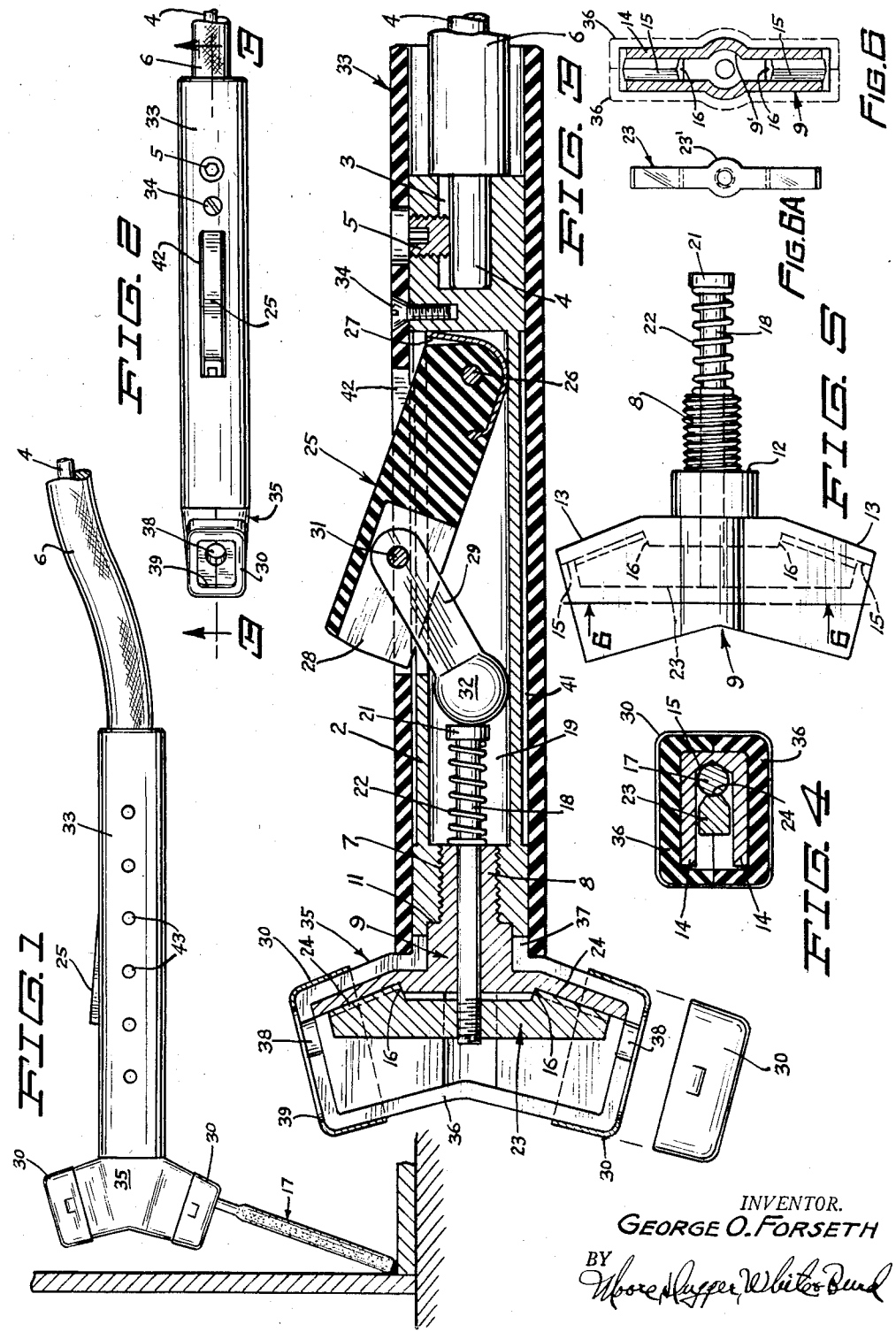
INVENTOR.
GEORGE O. FORSETH
BY
ATTORNEYS May 5, 1959
G. O. FORSETH
2,885,535
ELECTRODE HOLDERS
Filed June 8, 1956
2 Sheets-Sheet 2
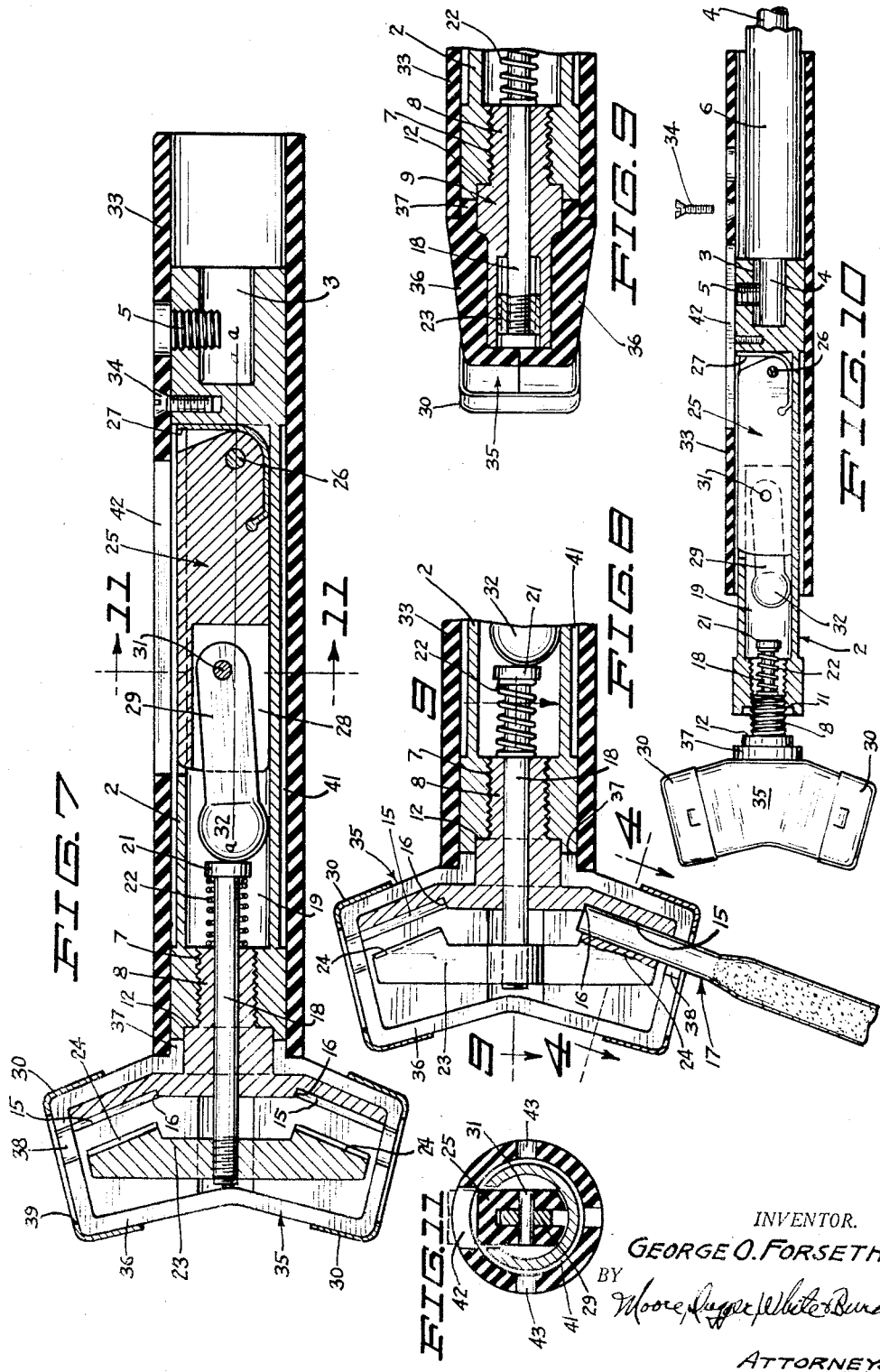
INVENTOR.
GEORGE O. FORSETH
BY
Moore, Sugrue, White & Burd
ATTORNEYS United States Patent Office 2,885,535
Patented May 5, 1959

2,885,535
ELECTRODE HOLDERS
George O. Forseth, Minneapolis, Minn.
Application June 8, 1956, Serial No. 590,330
3 Claims. (Cl. 219—143)

This invention relates to new and useful improvements in electrode holders, and an important feature of the invention is to provide such a holder which is highly efficient and practical in operation and which may readily be handled in difficult places such as overhead or in corners, or other confined areas, with utmost ease, and which may be readily and easily maintained in operating condition.

There are now available on the market numerous electrode holders of this general type, but to the best of my knowledge none of these have met the full approval of operators. The unique electrode holder herein disclosed is the result of long and costly experimental work in an attempt to provide an electrode holder which will adequately meet all of the requirements of the trade, and in which the objectionable features now inherent in present day holders of this general type have been completely and entirely eliminated.

An important object of the present invention, therefore, is to provide an electrode holder which comprises few parts, which is highly efficient and positive in operation, and is light in weight and inexpensive to maintain, which may be conveniently manipulated in remote places without fatigue, and in which the movable jaw is so constructed that it may readily and quickly be moved to an open position, as when inserting a welding rod into the jaws thereof, or releasing a welding rod therefrom.

A further object is to provide an electrode holder of the class described comprising a plurality of jaws, preferably two, arranged in diametrically opposed relation, whereby should one of said jaws become damaged when the holder is in use, the other of said jaws may be used in lieu thereof, or the jaws may be used interchangeably, thereby doubling the life of the holder.

A further and more specific object of the invention is to provide an electrode holder comprising an elongated metallic body having means at one end for connecting an electric conductor thereto, and being provided at its opposite end with a pair of diametrically opposed jaws, and an operating lever being mounted in the handle and operatively connected to said jaws, said lever being so positioned that it may readily and conveniently be actuated by the operator's hand when grasping the tool.

A further object is to provide bearing means in the fixed jaw adapted to cooperate with bearing means on the movable jaw for taking up excessive lateral strains exerted on the movable jaw by tapping the end of the electrode against a fixed object to remove accumulated slag therefrom, or when applying pressure to the handle of the holder to press the tip of the electrode firmly into contact with the work, which otherwise, under certain conditions, might bend the plunger rod and thus render the movable jaw inoperative.

A further object is to provide an electrode holder which readily lends itself for manufacture in quantity production at extremely low cost, said holder comprising a metallic body having a metallic head detachably secured to one end thereof, and said head having a pair of oppositely disposed stationary jaws therein and also having a plunger slidably mounted therein and carrying a pair of movable jaws which cooperate with said stationary jaws to provide dual pairs of jaws for selectively supporting a welding rod, said metallic body being completely enclosed within an insulating sleeve which constitutes the handle for the holder. The head also being insulated to form a completely insulated holder which, if inadvertently placed upon a metallic surface while connected to a source of electric energy, will not cause a short-circuit.

A further and more specific object of the invention resides in the unique construction of the head assembly which is detachably secured to one end of said metallic body in such manner that the head may readily be detached from the holder body for inspection and repairs should it become necessary to replace the head assembly or any of its component parts, such as the insulators, jaws, plunger or spring, while the handle portion of the holder remains attached to the welding cable.

Other objects of the invention reside in the provision of an abutment shoulder in the jaw supporting end of the elongated metallic body of the holder, which shoulder serves to provide a positive electrical contact between the head and said body, and also to align the jaws of the head with the operating lever of the holder; in the angular arrangement of the jaws relative to the longitudinal axis of the handle portion of the holder, whereby the welding rod supported in a pair of said jaws will be supported at the desired working angle; in the provision of means at the inner ends of each pair of jaws for abuttingly engaging the inner end of the welding rod to limit its inward movement into the jaws, should the operator tap the end of the welding rod against a fixed object to remove accumulated slag and other foreign material therefrom while using the holder; in the unique construction of the toggle mechanism for actuating the movable jaws; in the provision of the split insulating housing or jacket which completely encloses the jaw supporting head; in the provision of the cup-like clips or caps which are fitted over the laterally projecting end portions of the head to retain the two halves of said housing together; in the means provided for venting the interior of the handle of said holder to prevent it from becoming excessively hot when operating under a heavy load for prolonged periods; and in the unique construction of the apparatus, whereby all the dominant parts of the holder may readily and quickly be disassembled, when desired, to facilitate inspection and repairs.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a side elevational view of the electrode holder showing a welding rod supported therein and engaging an inside corner of the work, and also showing the angular relationship between the welding rod and the handle of the holder;

Figure 2 is a top view of the holder;

Figure 3 is a longitudinal sectional view on the line 3—3 of Figure 2, showing the jaws in their normal closed positions;

Figure 4 is a detail sectional view on the line 4—4 of Figure 8;

Figure 5 is a side view of the head detached from the handle;

Figure 6 is an end view of the fixed jaw showing the bearing means therein for the movable jaw;

Figure 6A is a similar view of the movable jaw showing the coacting bearing means thereon;

Figure 7 is a view similar to Figure 3, showing the operating lever depressed to a position within the outer insulating sleeve of the holder to permit the outer insulating sleeve of the handle portion of the holder to be removed from said body;

Figure 8 is a detail sectional view of the head showing a welding rod operatively engaged with a pair of the jaws, and also showing the limit stop provided at the inner ends of the stationary jaws adapted to be engaged by the inner end of the welding rod;

Figure 9 is a detail sectional view on the line 9—9 of Figure 8;

Figure 10 is an exploded view of the holder showing removal of the head and also showing the insulating sleeve of the handle portion of the holder released from the metallic body to permit said sleeve to be slid rearwardly or forwardly off the body for access to the toggle lever and inside of the body; and Figure 11 is a cross sectional view on the line 11—11 of Figure 7, showing the pivotal connection between the toggle link and the operating lever.

The novel electrode holder herein disclosed is shown comprising an elongated metallic body, generally designated by the numeral 2. The body 2 has a socket 3 in one end for receiving one end of an electric conductor 4, which preferably is fixedly secured in the socket 3 by soldering in the usual manner. In some instances it may be secured therein by means of a set screw 5, as indicated in Figure 3. The opposite end of conductor 4 is connected to a suitable source of electrical energy, not shown in the drawings. The cable is insulated, as shown at 6.

The opposite end of the metallic body 2 has a threaded socket 7 adapted to receive the threaded extension 8 of a jaw supporting head, generally designated by the numeral 9. Other means applicable for the purpose may be utilized for detachably securing the head 9 to the body 2, without departing from the scope of the invention.

To assure a good electrical connection between the head 9 and the elongated body 2, the adjacent end of the body 2 may be counterbored to provide an abutment shoulder 11 adapted to be engaged by a complemental shoulder 12 provided on the adjacent end of the head 9, as best illustrated in Figures 5 and 10.

The head 9 is formed with oppositely disposed arms or end portions 13—13, which preferably are U-shaped in cross-section to provide laterally spaced parallel walls 14—14, best illustrated in Figures 4 and 6. Each arm 13 of the head 9 is provided with a V-shaped stationary jaw 15, which terminate at their inner ends in abutment shoulders 16—16 adapted to be engaged by the inner end of a welding rod 17, as best illustrated in Figure 8.

A plunger 18 is slidably mounted in a bore in the head 9 and has its inner end extending well into a cavity 19 provided within the elongated body 2, as illustrated in Figures 3 and 7. Plunger 18 has a head 21 at its inner end between which and the adjacent end of the threaded extension 8 of the head, a suitable spring 22 is mounted. Spring 22 constantly urges the plunger 18 in a direction to the right, when viewed as shown in Figure 3.

A crosshead 23 is secured to the opposite end of plunger 18 and has its opposite end portions formed to provide a pair of movable jaws 24—24 adapted to cooperate with the stationary jaws 15—15 to grip the welding rod 17, as illustrated in Figure 8. The welding rod-engaging-faces of the movable jaws 24—24 are preferably shaped as shown in Figure 4, whereby the welding rod is gripped by three coacting surfaces, thereby to firmly grip the rod so that it cannot relatively move when supported in the jaws, as shown in Figure 8. The crosshead 23 is movable in a direction lengthwise of the body 2 between the spaced parallel walls 14—14 of the jaw supporting head, see Figure 4.

A feature of the invention resides in the means provided for resisting severe lateral strains which may be exerted on the plunger rod 18, when the electrode holder is in use, and the operator finds it necessary to tap the end of the electrode or welding rod against a fixed object to remove accumulated slag therefrom, which might, under certain conditions, slightly bend or deflect rod 18 to the extent the holder may be rendered inoperative. Certain classes of work may also require that the tip of the welding rod be held firmly thereagainst by the operator with considerable pressure, which may be sufficient to laterally bend the plunger rod 18, as above stated.

To protect the plunger rod against such excessive lateral strains, the head 9, carrying the stationary jaws 15, and the crosshead 23 carrying the movable jaws 24, are provided with coacting bearing means 9' and 23', respectively, which are so interfitted that the crosshead 23 is supported against severe lateral strains or pressures exerted thereagainst, throughout its full travel, thereby eliminating all danger of the plunger rod 18 becoming distorted and rendering the holder inoperative, even when the holder is roughly handled.

The bearing means 9' in the head 9 may readily be formed by laterally expanding or enlarging the central portion thereof, as shown in Figure 6, and then with a suitable boring tool, finishing the bearing means 9' to a predetermined diameter or size, adapted to slidably receive the enlarged bearing means 23' of the crosshead 23, as will be understood.

The means provided for manipulating the movable jaws is best illustrated in Figures 3 and 7, and comprises an operating lever, generally designated by the numeral 25. One end of lever 25 is pivotally secured to the elongated body 2 by a pivot pin 26 within the cavity 19. A flat spring 27 is shown constantly urging the lever 25 into the cavity 19 in the elongated body 2. In the drawings I have shown a flat spring for thus urging the operating lever into the cavity 19. It is to be understood, however, that any type of spring applicable for the purpose may be utilized without departing from the scope of the invention.

The opposite end portion of the operating lever 25 is recessed or slotted as indicated at 28 in Figures 3 and 7, to receive one end of a toggle link 29, pivotally connected to the lever 25 by a suitable pivot pin 31. The opposite end of the toggle link is formed with an enlarged spherical-like head 32 which is slidably supported on the bottom wall of the cavity 19 and is positioned to engage the head 21 of the plunger 18, as illustrated in Figures 3, 7 and 8. Thus, when the lever 25 is depressed into the cavity 19, the movable jaws 24—24 are moved outwardly away from the stationary jaws 15—15, as shown in Figure 7, thereby to permit the insertion of a welding rod between a pair of the jaws, or to release a welding rod therefrom, as will be understood.

The tension of spring 22 is relatively greater than the tension of spring 27, whereby spring 22 constantly urges the movable jaws 24—24 into gripping engagement with the stationary jaws 15—15 with sufficient force to electrically grip the welding rod, as will be understood by reference to Figure 8, when the operator releases his pressure on the operating lever 25. It is also to be understood that the operating lever, during operation of the holder, is normally positioned well within the cavity 19, as indicated in Figure 1. This results because of the welding rod 17 spacing apart the jaws, as shown in Figure 8. When so positioned, spring 27 retains the operating lever 25 in the cavity 19, as shown in Figure 7, thereby cutting down the hindrance of the operating lever to the welding operator's hand.

An outer enclosing sleeve 33, of a suitable insulating material, is removably fitted over the elongated metallic body 2, as shown in Figures 3 and 7, thereby to provide a convenient insulated grip or handle for the operator's hand. The sleeve 33 is removably secured to the metallic body 2 by a suitable screw 34, which preferably is constructed of a suitable insulating material such as nylon, thereby to protect the operator's hand against direct contact with the metallic body 2 during operation of the holder.

The operating lever 25, toggle link 29, and their supporting pivots 26 and 31 are so interconnected that when the lever 25 is depressed into the cavity 19, such parts cannot become "locked" on dead center. This may readily be noted by referring to Figure 7, wherein it will be noted that pivot pin 31 is laterally offset from line a—a, in an upward direction, when the lever is depressed to the bottom of the cavity, as when it is desired to slide the insulating sleeve 33 off the body 2, as indicated in Figure 10.

Another feature of the invention resides in the means provided for insulating the jaw supporting head 9 against direct contact with the work. To thus insulate the head 9, a suitable insulating housing or jacket, generally designated by the numeral 35, is fitted over the head and completely encloses and conceals it. The insulating housing is preferably made in two halves 36, as best illustrated in Figure 4, and the two halves are retained in operative position on the head 9 by a pair of cup-shaped clips 30—30. These clips frictionally grip the outer surfaces of the outer end portions of the opposed arms 13—13 of the head, and cooperate with the adjacent end of the insulating sleeve or handle 33 to secure the insulating jacket 35 to the head 9 in such a manner that it is not likely to become detached therefrom while the tool is in use.

By reference to Figures 3, 7 and 8, it will be noted that the housing 35 of the head 9 has an annular collar 37, the outer diameter of which corresponds to the outer diameter of the adjacent end of the metallic body 2. Collar 37 is inserted into the adjacent end of the handle or insulating sleeve 33, when said sleeve is in its normal position on the body 2, as shown in Figure 7.

The opposed ends of the jaw enclosing housing 35 are recessed to provide openings 38 which are aligned with the jaws, when the movable jaws are moved outwardly to the position shown in Figure 8. The end walls of the friction clips 30 are also cut away as indicated at 39 in Figure 2 to permit free passage of the welding rod into and out of the jaws. The hand gripping portion of the insulating sleeve 33 may be cylindrical in cross-section, as shown in Figure 11, or it may be made rectangular, if desired.

The intermediate portion of the elongated metallic body 2 is slightly reduced in diameter, as best indicated in Figures 3, 7 and 11, to provide an annular air circulating chamber 41 which is in communication with the atmosphere through the elongated opening 42 in the sleeve 33, as best shown in Figures 2 and 3, and a series of air circulating passages 43, provided in the cylindrical wall of sleeve 33 at the opposite sides thereof, as indicated in Figures 1 and 11.

The novel electrode holder herein disclosed is extremely simple in construction, as may readily be noted by reference to Figure 10. It comprises essentially five component parts; namely, the elongated metallic body 2, the insulating sleeve or handles 33, head assembly shown in Figure 5, head insulating jacket 35, and toggle mechanism 29. These parts may be readily assembled, as will be understood by reference to Figures 3, 7 and 10, without the use of special tools.

If for some reason, it should become necessary to disassemble the composite holder, the head assembly 9 is first detached from the body assembly 2, whereby the operating handle 25 and toggle lever 29 may drop freely in to the body cavity 19, as shown in Figures 10 and 11. This results because when the plunger 18 is disengaged from the adjacent end of the toggle lever 29, spring 27 will retract toggle lever 29 and operating lever 25 into the cavity 19. Screw 34 may then be removed, whereupon the tubular handle member 33 is freely slidable on body member 2 in either direction to completely detach it from the body assembly 2, thus to further expose screw 5 and permit manipulation of said screw, as when attaching or detaching the body assembly 2 from the electric conductor cable 4.

The threaded connection between the jaw head 9 and the elongated body 2 is such that the head may readily be removed from the body 2 without removing insulating sleeve 33. This is an important feature of the holder, as it permits convenient removal of the head for inspection and repair at any time without disassembling the handle portion of the holder, and whereby should the jaw head become damaged while in use, another head may be quickly substituted therefor. The split insulating housing 35 of the jaw head 9 may readily be removed by simply detaching the friction clips 30—30 from the ends of the opposed arms 13—13 of the head, as indicated in Figure 3.

The abutment shoulders 11 and 12 serve to provide a good electrical connection between the metallic body 2 and the head 9, as hereinbefore stated. In addition, they also serve to align the jaws with the operating handle 25, whereby the median plane of the jaws will always be coincident with the median plane of the operating lever 25, when the head is firmly secured in the metallic member 2.

The head assembly, illustrated in Figure 5, may readily be constructed as a unit independent of the handle portion of the tool. In like manner, the elongated metallic body member 2, including the operating lever 25 and toggle link 29 may be completely fabricated and assembled as a unit, independently of the head 9, which greatly facilitates manufacture and maintenance, as will be understood.

The welding rod stop shoulders 16 of the fixed jaws 24 of the head 9 limits the inward movement of the welding rod 17, and makes it possible for the operator, should the outer or welding end of the rod accumulate slag or foreign matter, to tap the end of said rod against the work or some other fixed object to quickly knock the accumulated material from the welding rod, whereby the welding operation may be continued. Plunger 18 is adjustably secured in the crosshead 23 of the movable jaws 24—24, thereby to vary the opening between the movable and fixed jaws 24—24 and 15—15, respectively, as will be understood by reference to Figures 3 and 7. The head 21 of plunger 18 is preferably hexagonal in shape, to accommodate a suitable wrench.

Because of the simple and inexpensive construction of the jaw head 9, and the simple manner in which it is detachably secured to the handle portion of the holder, each holder may be furnished with two or more jaw heads, each such head being adapted for handling welding rods falling within a given range size. For example, one head may accommodate welding rods ranging from one eighth to one quarter inch in diameter, and another head may accommodate rods ranging from five sixteenths to three eighths inch in diameter. Also by equipping the holder with two sets of jaws, should one set of jaws become damaged from excessive heat, the operator may quickly substitute another set of jaws without loss of valuable time.

The tubular construction of the body 2 of the holder, in addition to providing a cavity for the toggle link 29 and operating lever 25, also serves to prevent the grip portion or insulating sleeve 33 of the holder from becoming excessively hot, when the tool is in use, because of the thin wall of the cavity providing maximum cooling area.

The novel holder herein disclosed essentially consists of two parts, that is, the body assembly 2 and the head assembly 9. Since the only movable parts in the body assembly are the toggle lever 29 and operating handle 25, there is nothing to go wrong in the handle portion of the holder, and therefore when the composite holder is once operatively secured to the electric conductor or cable 4 it becomes, in effect, an integral part of the cable circuit and may not be removed over long periods of time.

The head assembly however is constantly subjected to high temperatures and relatively greater abuse, and therefore may require more frequent servicing. To facilitate such servicing, the head assembly may readily be detached from the body assembly without disturbing the latter. When the head assembly 9 is thus removed from the body assembly 2, the jaws 23 and 24 may be detached from one another for repairs, or a new head assembly may be substituted for the damaged or worn head assembly. Thus, should one or both of the jaws become damaged while the holder is in use a new head may be quickly substituted for the damaged head without loss of costly operators' time. Head insulator 35, which is made in two identical halves, may also readily be replaced if necessary, by simply removing the brass ferrules 30 from the head when the head is detached from the body assembly 2.

Because of the nature of the work to which a tool of this general type is constantly subjected, it is of utmost importance that the tool be of a very rugged construction, and that it is so designed that repairs may be made thereto when necessary in a minimum of time, in order to minimize loss of time by the operator and to maintain maximum production. Other important features of the invention reside in the dual head construction which provides longer life, in the arrangement of the operating handle whereby it may disappear into the body for streamlining so as to permit the operator to get into more difficult places, and in the complete insulation of the tool handle and head whereby the tool may be placed on grounded work being operated upon without danger of becoming short circuited, an extremely important attribute in a tool of this general type.

It has also been found that by the use of the novel electrode holder herein disclosed relatively greater economy is obtained in the use of electrodes, as the electrode inserted into the tool may be practically completely used up which in the regular clamp type electrode holders is quite impossible.

The foregoing detailed description has been given for clearness of understanding only, and no unnecessary limitations should be understood therefrom, and the appended claims should be construed as broadly as permissible in view of the prior art.

I claim is my invention:

1. An electrode holder comprising an elongated metallic body having a cavity therein intermediate of its ends, a tubular insulating sleeve fitting over said elongated body and providing a handle portion for the holder, one end of said body having means for electrically connecting it to an electric conductor, and the opposite end of said body having an axial socket therein, a head comprising a plurality of fixed jaws and having an extension receivable in said socket, means for detachably securing said extension in said socket, and whereby the head may readily and quickly be detached from the handle portion as a unit, said head and extension having an axial bore therein, a plunger mounted for reciprocal movement in the bore in said extension and having one end extending into said cavity, the other end of said plunger having a plurality of movable jaws secured thereto and normally disposed in gripping relation to said stationary jaws, means mounted in said cavity and engagable with the inner end of said plunger to effect operation of said jaws, and the stationary jaws of said head being U-shaped in cross-section and comprising laterally spaced parallel walls between which the movable jaws secured to said plunger are supported.

2. An electrode holder comprising an elongated metallic body having a cavity therein intermediate of its ends, a tubular insulating sleeve fitting over said elongated body and providing a handle portion for the holder, one end of said body having means for electrically connecting it to an electric conductor, and the opposite end of said body having an axial socket therein, a head comprising a plurality of fixed jaws and having an extension receivable in said socket, means for detachably securing the extension in said socket whereby the head may readily and quickly be detached from the handle portion as a unit, said head and extension having an axial bore therein, a plunger mounted for reciprocal movement in the bore in said extension and having one end extending into said cavity, the other end of said plunger having a plurality of movable jaws secured thereto and disposed in gripping relation to said stationary jaws, means mounted in said cavity and engageable with the inner end of said plunger to effect operation of said jaws, the stationary jaws of said head being U-shaped in cross-section and comprising laterally spaced parallel walls between which the movable jaws secured to said plunger are supported, and interfitting bearing elements provided between the laterally spaced walls of said stationary jaws and said movable jaws for keeping the stationary and movable jaws in parallel relation to each other, and to resist lateral strains exerted against said plunger and head when an excessive pressure is applied against the electrode when in use, or when striking the tip of the electrode aginst a fixed object to remove accumulated slag therefrom.

3. An electrode comprising an elongated metallic body having a cavity therein intermediate of its ends, a tubular insulating sleeve fitting over said elongated body and providing a handle portion for the holder, one end of said body having means for electrically connecting it to an electric conductor, and the opposite end of said body having an axial socket therein, a head comprising a plurality of fixed jaws and having an extension receivable in said socket, means for detachably securing said extension in said socket whereby the head may readily and quickly be detached from the handle portion as a unit, said head and extension having an axial bore therein, a plunger mounted for reciprocal movement in the bore in said extension and having one end extended into said cavity, the other end of said plunger having a plurality of movable jaws secured thereto and disposed in gripping relation to said stationary jaws, means mounted in said cavity and engageable with the inner end of said plunger to effect operation of said jaws, the stationary jaws of said head being U-shaped in cross-section and comprising laterally spaced parallel walls between which the movable jaws secured to said plunger are supported, an operating lever having one end pivoted to said elongated member within said cavity and normally having its opposite end projecting from said cavity through an opening in the wall of said insulating sleeve, a plunger engaging element having one end movably connected to said operating lever, and having its opposite end slidable in said cavity and disposed in abutting engagement with the inner end of said plunger, whereby when said operating lever is depressed into the cavity by the operator, said plunger engaging element is actuated to axially translate the plunger in its supporting bore, thereby to move the movable jaws into open position relative to said fixed jaws to permit the insertion of an electrode into a selected pair of the jaws of said head, or to effect the removal of an electrode therefrom.

References Cited in the file of this patent

UNITED STATES PATENTS

| | | |
|---|---|---|
| 2,312,763 | Linquist | Mar. 2, 1943 |
| 2,372,251 | Checkos | Mar. 27, 1945 |
| 2,398,032 | Munro et al. | Apr. 9, 1946 |
| 2,405,406 | Combridge | Aug. 6, 1946 |
| 2,428,083 | Kolstad | Sept. 30, 1947 |

FOREIGN PATENTS

| | | |
|---|---|---|
| 1,011,275 | France | Dec. 23, 1953 |
| 59,200 | France | Dec. 23, 1953 |
| | (Addition to French Patent 1,011,275) | |